(12) United States Patent
Jankowiak et al.

(10) Patent No.: US 8,852,409 B2
(45) Date of Patent: Oct. 7, 2014

(54) HIGH PURITY CERAMIC OXYGEN GENERATOR

(71) Applicants: Jerome T. Jankowiak, Williamsville, NY (US); David F. Suggs, Eggertsville, NY (US); Sadashiv M. Swami, Tonawanda, NY (US); Lane A. Keser, Tonawanda, NY (US); Arthur C. Selover, Tonawanda, NY (US)

(72) Inventors: Jerome T. Jankowiak, Williamsville, NY (US); David F. Suggs, Eggertsville, NY (US); Sadashiv M. Swami, Tonawanda, NY (US); Lane A. Keser, Tonawanda, NY (US); Arthur C. Selover, Tonawanda, NY (US)

(73) Assignee: Praxair Technology, Inc., Danbury, CT (US)

( * ) Notice: Subject to any disclaimer, the term of this patent is extended or adjusted under 35 U.S.C. 154(b) by 110 days.

(21) Appl. No.: 13/782,219

(22) Filed: Mar. 1, 2013

(65) Prior Publication Data

US 2014/0076736 A1   Mar. 20, 2014

Related U.S. Application Data

(60) Provisional application No. 61/702,863, filed on Sep. 19, 2012.

(51) Int. Cl.
| | |
|---|---|
| *C25B 15/02* | (2006.01) |
| *C25B 9/08* | (2006.01) |
| *C25B 1/02* | (2006.01) |
| *B01D 53/32* | (2006.01) |
| *B01D 53/22* | (2006.01) |
| *C01B 13/02* | (2006.01) |

(52) U.S. Cl.
CPC .............. *C25B 15/02* (2013.01); *B01D 53/326* (2013.01); *B01D 53/22* (2013.01); *C25B 1/02* (2013.01); *C01B 13/0255* (2013.01); *C25B 9/08* (2013.01)
USPC .......................................... 204/258; 205/634

(58) Field of Classification Search
CPC .......... B01D 53/326; C25B 1/02; C25B 9/08; C25B 15/02
USPC ................................... 204/258; 205/633–636
See application file for complete search history.

(56) References Cited

U.S. PATENT DOCUMENTS

| | | |
|---|---|---|
| 5,205,990 A | 4/1993 | Lawless |
| 5,417,101 A | 5/1995 | Weich |
| 5,649,517 A | 7/1997 | Poola et al. |
| 8,070,922 B2 * | 12/2011 | Nelson et al. ................. 204/266 |
| 2010/0076280 A1 | 3/2010 | Bernstein et al. |
| 2010/0116680 A1 | 5/2010 | Reed et al. |
| 2010/0313762 A1 | 12/2010 | Roeck et al. |
| 2012/0000360 A1 | 1/2012 | Richet et al. |

* cited by examiner

*Primary Examiner* — Nicholas A Smith
(74) *Attorney, Agent, or Firm* — Robert J. Hampsch

(57) ABSTRACT

A high purity ceramic oxygen generator incorporating a module utilizing a plurality of tubular ceramic membrane elements and configured to operate in: (i) a pressurizing mode to separate oxygen from an oxygen containing feed stream when an electric potential difference is applied to induce oxygen ion transport in an electrolyte thereof; and (ii) an idle mode when the electric potential difference is removed. The ceramic oxygen generator further includes one or more manifolds as well as one or more automatic purge valves located upstream of the oxygen receiving tank. The purge valve is opened for a pre-set duration upon initiation of the pressurization mode to purge any nitrogen or other contaminating gas that diffuses into the ceramic oxygen generator during idle mode thereby ensuring the desired purity level of oxygen is received by the oxygen receiving tank.

12 Claims, 6 Drawing Sheets

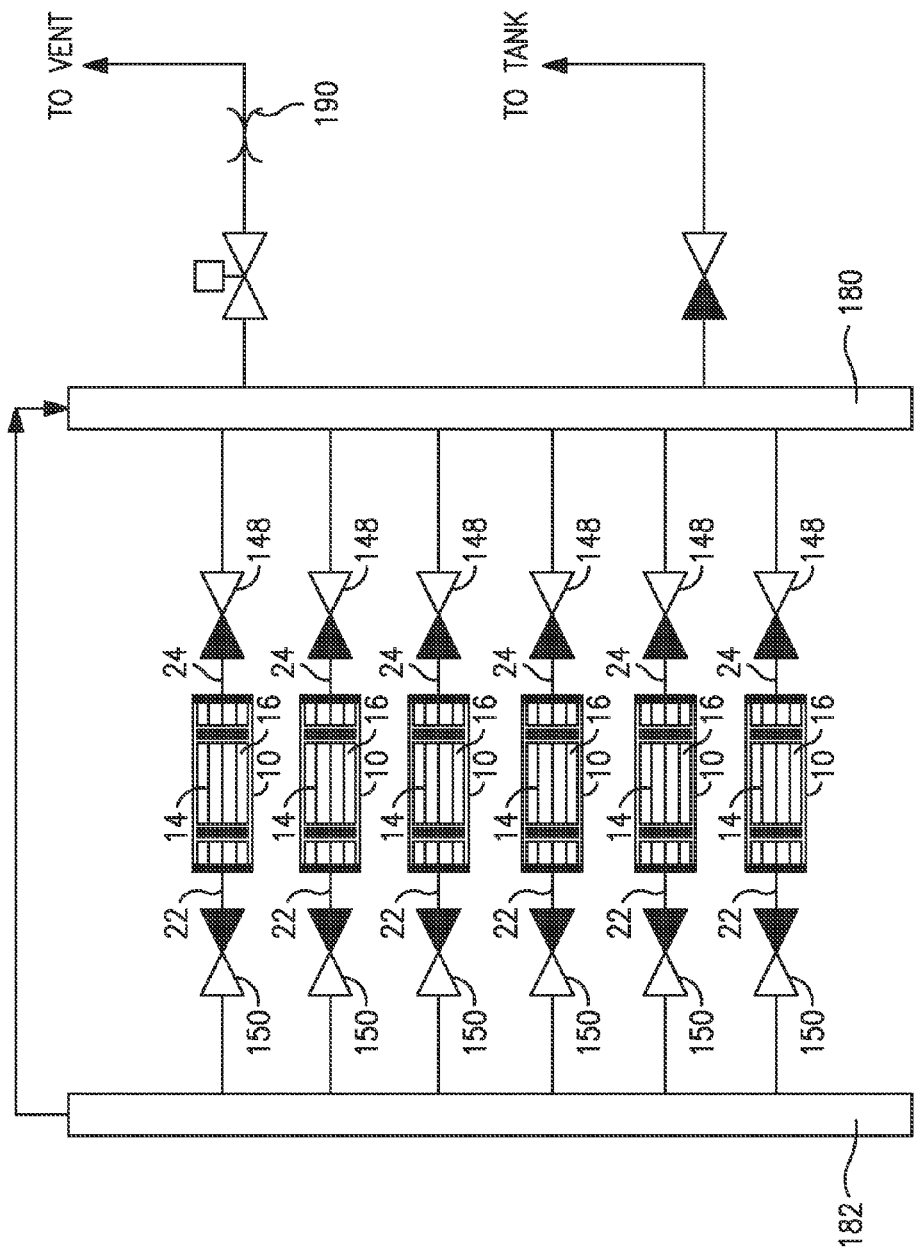

HIGH PURITY CERAMIC OXYGEN GENERATOR

CROSS REFERENCE TO RELATED APPLICATIONS

The present invention claims the benefit of and priority from U.S. provisional patent application Ser. No. 61/702,863 filed Sep. 19, 2012.

FIELD OF THE INVENTION

The present invention relates to a ceramic oxygen generator that incorporates a plurality of ceramic membrane elements, each configured to separate oxygen from an oxygen containing feed stream when an electric potential difference is applied to produce oxygen ion transport through an electrolyte of the ceramic membrane elements. More particularly, the present invention relates to a system and method for ensuring only high purity oxygen is received by the receiving tank by initiating a purge mode wherein a purge valve assembly is opened for a pre-set duration after any idle period to vent the gases within the ceramic membrane elements and purge any nitrogen or other contaminating gas that may have diffused into the ceramic membrane elements during idle period.

BACKGROUND

Electrically driven ceramic oxygen generators and oxygen separators are used to separate oxygen from an oxygen containing feed stream, for example, air. Electrically driven ceramic oxygen generators or oxygen separators can utilize planar or tubular ceramic membrane elements having a layered structure containing an electrolyte layer capable of transporting oxygen ions when subjected to an elevated temperature, cathode and anode electrode layers located at opposite surfaces of the electrolyte layer and current collector layers to supply an electrical current to the cathode and anode electrode layers.

When the tubular membrane elements are subjected to the elevated temperature, the oxygen contained in a feed will ionize on one surface of the electrolyte layer, adjacent the cathode electrode layer by gaining electrons from an applied electrical potential. Under the impetus of the applied electrical potential, the resulting oxygen ions will be transported through the electrolyte layer to the opposite side, adjacent the anode layer and recombine into elemental oxygen.

The tubular membrane elements are housed in an electrically heated containment or enclosure to heat the tubular ceramic membrane elements to an operational temperature at which oxygen ions will be transported. Additionally, such tubular membrane elements can be manifolded together such that the oxygen containing feed is passed into the heated containment and the separated oxygen is withdrawn from the tubular membrane elements through a manifold. In certain purification applications, the oxygen containing feed can be passed through the interior of the tubular membrane elements and the separated oxygen can be withdrawn from the containment.

Typical materials that are used to form the electrolyte layer are yttrium or scandium stabilized zirconia and gadolinium doped ceria. The electrode layers can be made of mixtures of the electrolyte material and a conductive metal, a metal alloy or an electrically conductive perovskite. Current collectors in the art have been formed of conductive metals and metal alloys, such as silver as well as mixtures of such metals and metallic oxides.

The tubular membrane elements can be contained in one or more modules in which in each module, the tubular membrane elements are arranged in bundles and are held in place by end insulation members adjacent to the opposite ends of the tubular membrane elements. These modules can be positioned within insulated, heated enclosures to heat the tubular membrane elements to an operational temperature at which oxygen ion transport can occur. The insulated enclosure also has inlets and outlets within end walls of the enclosure to allow an oxygen containing feed stream to be passed into the enclosure and thereby to contact the tubular membrane elements. As a result of the oxygen separation, a retentate stream is formed that is discharged from the enclosure through the outlet. This type of electrically driven oxygen separation device is shown in U.S. Patent Application Publication No. 2010/0116680 A1.

As can be appreciated, it is important that electrically driven oxygen separation devices reliably deliver high purity oxygen and at the lowest cost possible. With respect to reliability, a major problem with electrically driven oxygen separation devices is that failure of the tubular membrane elements can occur. As a result, the oxygen containing feed stream will pass through the point of failure in a particular tubular membrane and little if any oxygen will be separated by the membrane that has the defect. Since a major advantage of supplying oxygen from an electrically driven oxygen separation device is that the oxygen can be produced at ultra-high purity, the defective tubular membrane element will result in an unacceptable decrease in purity of the oxygen product. Therefore, as a result of such failure, the electrically driven oxygen separation device will have to be removed from service. Furthermore, such a device is most useful if the outlet of oxygen separation modules are connected to a storage tank and the oxygen is stored at pressure. In the case of a tube failure, the stored oxygen in the tank will discharge through the fractured ceramic tube. In order to reduce costs, the electrically driven ceramic oxygen generator has to be assembled in a cost efficient manner. In the patent application discussed above, the use of a plurality of modules of such ceramic membrane elements coupled with polymeric end seals go a long way toward reducing assembly costs. However, such ends seals represent another possible point of failure because they have only a limited ability to withstand the high temperatures that are necessary to induce the oxygen ion transport in the tubular ceramic membrane elements.

When operated in a continuous mode of oxygen generation, a properly designed ceramic oxygen generator is capable of producing very high purity oxygen. However, during normal operation, the ceramic oxygen generator will typically experience idle periods often dictated by the end-user oxygen supply requirements. It has been observed that during such idle periods, the seal materials used within the typical ceramic oxygen generator become compromised, thereby allowing the high purity oxygen to leak from the ceramic modules and/or allow nitrogen or other contaminants to diffuse into the modules and ceramic membrane elements. In addition, the ceramic modules and associated manifolds used in typical ceramic oxygen generators contain a significant number of fittings that are also potential sources of leaks.

As will be discussed, the present invention provides an electrically driven ceramic oxygen generator device that, among other advantages mitigates the oxygen purity concerns arising during idle mode and is capable of ensuring the prescribed purity level of high purity oxygen is always delivered to the receiving tank.

SUMMARY OF THE INVENTION

The present invention may be characterized as an electrically driven ceramic oxygen generator comprising an oxygen separation module(s) having a plurality of ceramic membrane elements and a high purity oxygen collection network. Each of the ceramic membrane elements has an anode layer, a cathode layer, an electrolyte layer located between the anode layer and the cathode layer and each of the ceramic membrane elements configured to separate oxygen from an oxygen containing feed stream when an electric potential difference is applied between the anode layer and the cathode layer to induce oxygen ion transport in the electrolyte. The high purity oxygen collection network is an arrangement configured to collect the separated oxygen from the plurality of ceramic membrane elements. The present ceramic oxygen generator also includes a power source electrically coupled to the oxygen separation module(s) and the plurality of ceramic membrane elements to apply the electric potential difference between the anode layer and the cathode layer of each the ceramic membrane elements and a receiver tank configured to receive the separated oxygen.

The ceramic oxygen generator also includes a purge valve assembly operatively connected to the oxygen separation module(s) and configured to vent or exhaust a flow of the separated oxygen from the oxygen separation module(s) when the purge valve assembly is open or actuated. The purge valve assembly further includes a control valve and a flow orifice configured to maintain the pressure inside the ceramic membrane elements when the electric potential difference is applied the ceramic membrane elements and the purge valve assembly is commanded to the open position. A microprocessor based controller is also part of the ceramic oxygen generator and is operatively configured to: (i) open or activate the purge valve assembly for a prescribed duration upon initiation of the applied electric potential difference to the oxygen separation module(s) so as to vent or exhaust the separated oxygen and any contaminants contained therein to the surrounding air; and (ii) close or deactivate the purge valve assembly after the prescribed duration so as to direct the separated oxygen from the collection network to the receiver tank.

In the preferred embodiments, the plurality of ceramic membrane elements are of tubular configuration, wherein each of the tubular ceramic membrane elements has an inner anode layer, an outer cathode layer, an electrolyte layer located between the anode layer and the cathode layer to form the electrolyte and two current collector layers located adjacent to and in contact with the anode layer and the cathode layer. The current collectors are preferably situated on the inside and outside of the tubular ceramic membrane elements to allow the electrical potential to be applied by the power source.

The ceramic oxygen generator also preferably includes one or more check valves and manifolds disposed upstream of the receiver tank and downstream of the oxygen collector network. The check valves are configured to permit the flow of the separated oxygen from the oxygen separation module(s) to the receiver tank but prevent flow out of the receiver tank back through the oxygen separation module(s). The manifold(s) are configured to receive the flows of separated oxygen from the oxygen separation module(s) and direct the flows to the receiver tank or the purge valve assembly, as appropriate.

The present invention may also be characterize as a method of enhancing the purity of oxygen generated by a ceramic oxygen generator comprising the steps of: (a) initiating start-up of the ceramic oxygen generator by applying an electric potential difference between an anode layer and a cathode layer of a plurality of ceramic membrane elements to induce oxygen ion transport in an electrolyte located between the anode layer and the cathode layer and produce an oxygen stream, wherein the plurality of ceramic membrane elements are contained within at least one oxygen separation module of the ceramic oxygen generator and are configured to separate oxygen from an oxygen containing feed stream when the electric potential difference is applied; (b) purging the oxygen stream produced in the at least one oxygen separation module by venting the produced oxygen stream and any contaminants entrained therein via an open purge valve assembly disposed downstream of the at least one oxygen separation module for a prescribed duration; and (c) closing the purge valve assembly and continuing to apply the electric potential difference between the anode layer and the cathode layer of the plurality of ceramic membrane elements to produce a high purity oxygen stream. The ceramic oxygen generator is in a pressurizing mode when the electric potential difference is applied between the anode layer and the cathode layer of the plurality of ceramic membrane elements and the purge valve assembly is closed and in a purge mode when the electric potential difference is applied and the purge valve assembly is open.

BRIEF DESCRIPTION OF THE DRAWINGS

While the specification concludes with claims that distinctly point out the subject matter that Applicants regard as their invention, it is believed that the invention will be understood when taken in connection with the accompanying drawings in which:

FIG. 6 is a schematic illustration of the ceramic oxygen generator with selected components depicted including the ceramic membrane modules, check valves, manifolds, and purge valves in accordance with the present invention.

DETAILED DESCRIPTION

Figure 1:
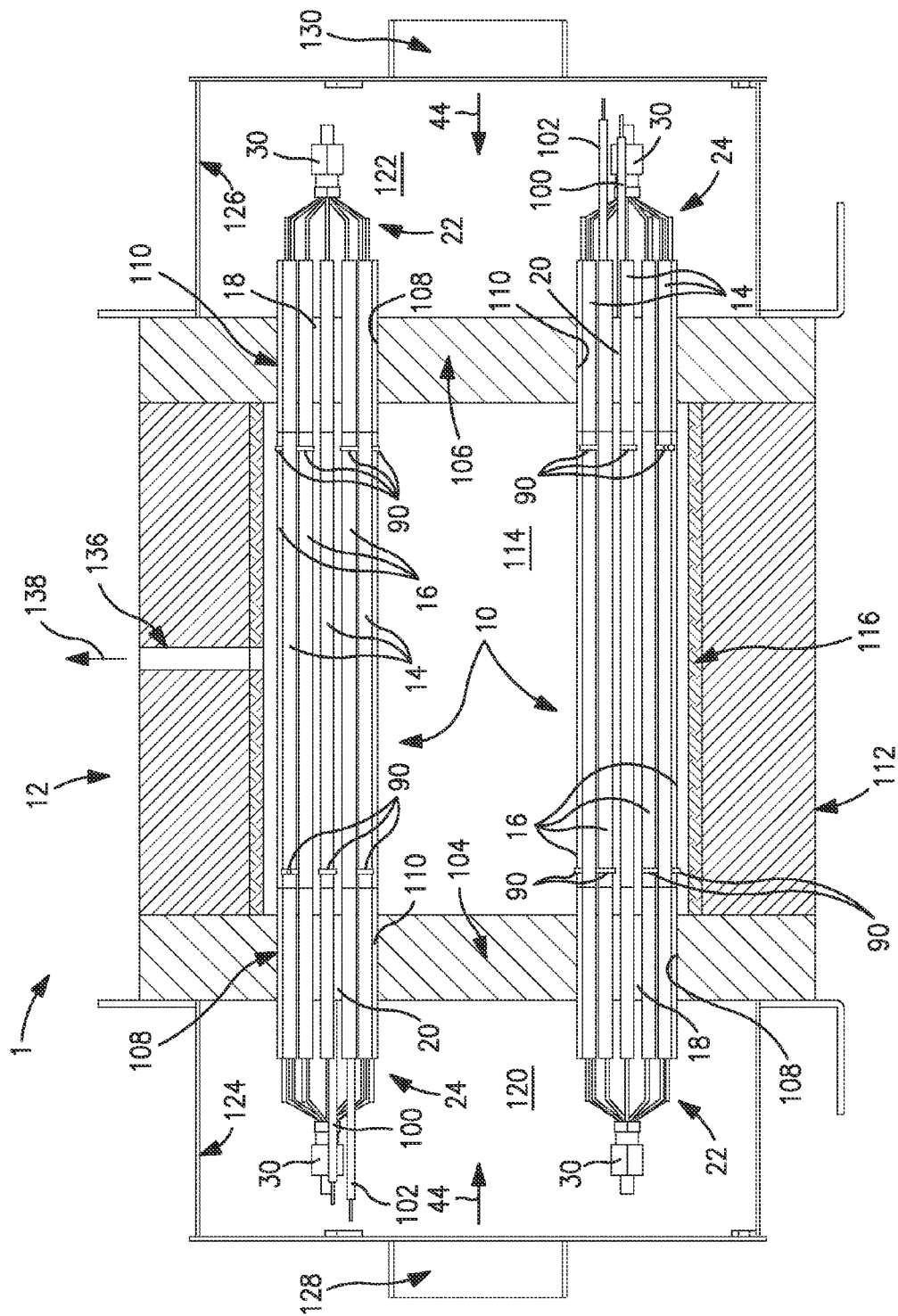
FIG. 1 is a schematic sectional view of an electrically driven ceramic oxygen generator.
Figure 5:
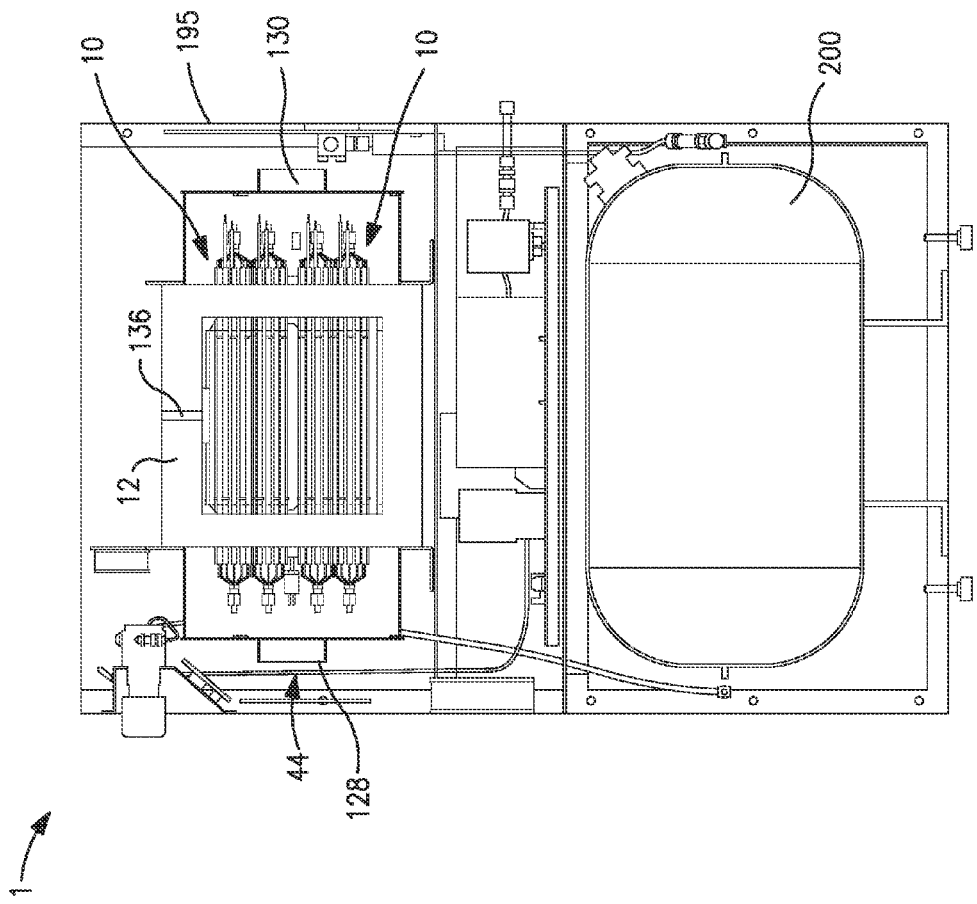
FIG. 5 is an illustration showing a sectional side view of the electrically driven ceramic oxygen generator in accordance with the present invention.

With reference to FIG. 1 and FIG. 5, an electrically driven oxygen separator or ceramic oxygen generator 1 of the present invention is illustrated that has two modules 10 (See FIG. 1) or four modules (See FIG. 5) housed within an enclosure 12. It is understood that there could be more or fewer modules 10 depending upon the application of an oxygen separation in accordance with the present invention.

Figure 2:
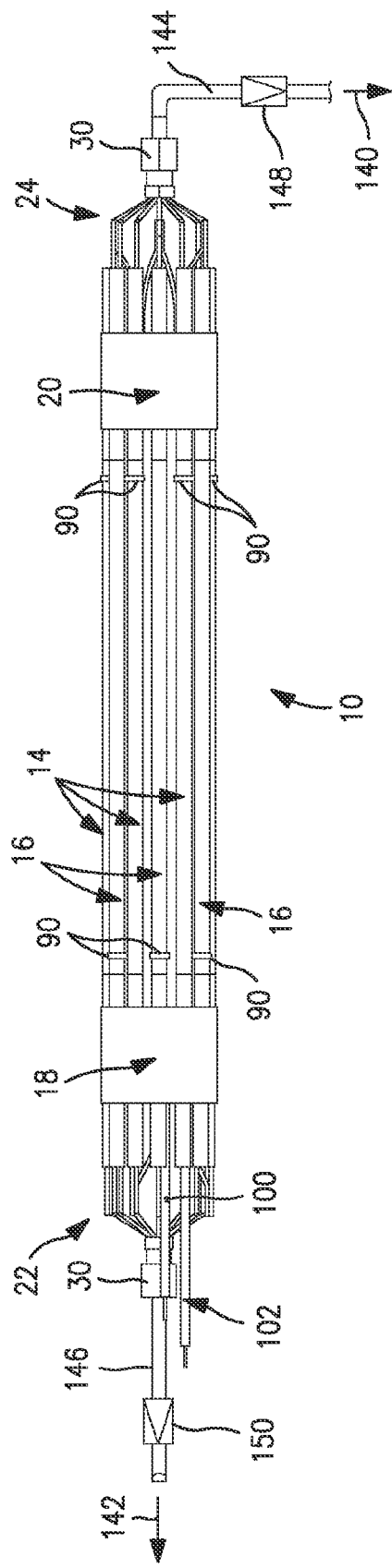
FIG. 2 is an elevation view of a ceramic module of the electrically driven ceramic oxygen generator of FIG. 1.

As shown in more detail in FIG. 2, each of the modules 10 are formed by a bundle of tubular membrane elements that are divided into a first portion or group of the tubular membrane elements 14 and a second portion or group of the tubular membrane elements 16. The first and second portions of the tubular membrane elements are held in position by end insulation members 18, 20 that are fabricated from high purity alumina fiber. The tubular membrane elements for exemplary purposes can have an outer diameter of about 6.35 mm, a total wall thickness of about 0.5 mm. and a length of about 55 cm. The oxygen that is separated by such first and second portions of the tubular membrane elements 14, 16 are collected by first and second collection networks 22, 24 that as illustrated are spaced apart from one another with the first and second portions of the tubular membrane elements 14, 16 located between the first and second collection networks 22, 24.

The first and second collection networks 22, 24 are connected to the first and second portions of the tubular membrane elements 14, 16 such that oxygen is received by the first collection network 22 from the first portion of the tubular membrane elements 14 and by the second collection network 24 from the second portion of the tubular membrane elements 16.

As can be appreciated, it is possible to construct an embodiment of the present invention in which there is no such alternation of tubular membrane elements and elongated elements. For example the first portion of the tubular membrane elements 14 could be located on one side and the second portion of the tubular membrane elements 16 could be located on the other side of the module. In such case, the first elongated elements 14 would be located one side of the module 10 and the second elongated elements 16 would be located on the opposite side. Furthermore, embodiments of the present invention are also possible in which the tubular membrane elements are located in the same plane. As can be appreciated, the elongated collection elements extending therefrom at right angles to penetrate the end seals of the tubular membrane elements. In any embodiment, the tubular membrane elements are divided into portions such that one collection network conducts the oxygen from one portion and the other collection network will conduct oxygen from the other portion.

Figure 4:
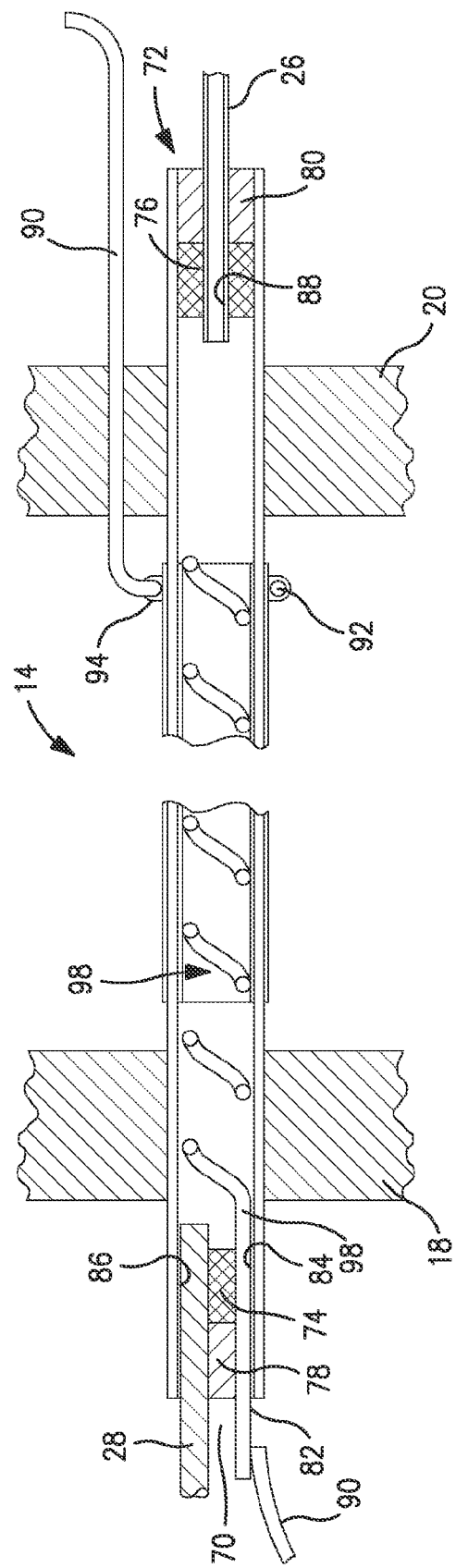
FIG. 4 is a schematic, sectional view of a tubular membrane element used in a module shown in FIG. 2.

With reference to FIG. 4, during operation of the oxygen separator or ceramic oxygen generator 1, the oxygen contained in oxygen containing feed stream 44 contacts the current collector layer 40 and permeates through pores thereof to the cathode layer 36 which as indicated above is also porous. The oxygen ionizes as a result of an electrical potential applied to the cathode and anode layers 34, 36 at current collector layers 40, 42. The resulting oxygen ions are transported through the electrolyte layer 38 under the driving force of applied potential and emerge at the side of the electrolyte layer 38 adjacent the anode layer 34 where electrons are gained to form elemental oxygen. The oxygen permeates through the pores of the anode layer 36 and the adjacent current collector 42 where the oxygen passes into the interior of the tubular membrane elements 14. The same function, in the same manner would be obtained for tubular membrane elements 16.

It is to be noted, that although the cathode layer is located on the outside of the tubular membrane elements 14, 16 it is possible to reverse the layers so that the anode layer were located on the outside of the tubular membrane elements 14, 16 and the cathode layer were located on the inside. Such an embodiment would be used where the device were used as a purifier. In such case the oxygen containing feed would flow on the inside of the tubular membrane elements 14.

Tubular membrane elements 14, 16 incorporate end seals 70, 72 formed at the opposite ends thereof. Each of the end seals 70, 72 are formed by plug-like members 74, 76 that are each fabricated from an elastomer to effect a seal at the ends of the tubular membrane elements 14, 16. A suitable elastomer is a VITON® fluoropolymer elastomer obtained through DuPont Performance Elastomers L.L.C. of Wilmington, Del., United States of America.

During operation of tubular membrane elements 14, 16 oxygen will accumulate and will tend to force the plug-like members 74, 76 in an outward direction and from the ends of tubular membrane elements 14, 16. In order to retain the plug-like members 74, 76 within the end of tubular membrane elements 14, 16 deposits of a ceramic adhesive 78, 80 are introduced into the ends of tubular membrane elements 14, 16 at a location adjacent to plug-like member 74 and plug-like member 76, respectively. A suitable ceramic adhesive can be a RESBOND™ 940 fast setting adhesive manufactured by Cotronics Corporation of Brooklyn, N.Y., United States of America. It is to be noted that other suitable means to retain plug-like member 74, 76 could be employed such as mechanical keys located adjacent to plug-like member 74 that penetrate opposed transverse bores defined at the ends of tubular membrane elements 14, 16 or sleeves cemented in place within the ends of tubular membrane elements 14, 16.

As illustrated, an elongated element 28 penetrates the deposit 78 and the plug-like member 74 along with an electrical feed through 82 and an elongated elements 26 penetrates deposit 80 and plug-like member 76. In this regard an axial bore 84, 86 are defined within plug-like member 74 for penetration of electrical feed through 82 and the second elongated element 28. An axial bore 88 is provided within plug-like member 76 for penetration of the elongated element 26.

In order to install plug-like members 74, 76 within the end of tubular membrane elements 14, 16, the same is fabricated with a larger outer diameter than the inner diameter of tubular membrane elements 14, 16 and then cooled with liquid nitrogen. The percentage difference in diameters can be about 10 percent. Thereafter, plug-like members 74, 76 are installed in the ends of tubular membrane elements 14, 16 and as such members warm to ambient temperature, the same expands to produce a seal within the ends of tubular membrane element 14, 16. Additionally, each of the bores 84, 86, 88 are all sized smaller than the associated electrical feed through 82 and the elongated elements 28, 26. After installation and warming of the plug-like members 74, 76, the electrical feed through 84 and the elongated elements 28, 26 are forced through the smaller bores to create seals. Thereafter, the ends are filled with the deposits of ceramic adhesive 78, 80 to complete the end seals. As could be appreciated, other types of end seals are known in the art such as ceramic end caps and ceramic deposits within the tubes.

The potential is applied to each of the tubular membrane elements 14, 16 by means of a connection to the current collector layer 42 adjacent of the cathode layer 34 by means of a conductor 90 that is looped around the current collector layer 42 by a loop 92 that is held in place by silver paste 94. Connection is established to current collector layer 40 adjacent the anode layer 36 by means of a conductor 90 that is attached to a current distributor 98 of helical configuration. Conductor 90 passes through the electrical feed through 82.

Although the tubular membrane elements 14, 16 could be connected in parallel, preferably a series connection is established in which the current collector 40 of each of the tubular membrane elements 14, 16 is connected to the current collector 42 of the next in series of the tubular membrane elements 14, 16. Therefore, the current collector 40 of each particular first tubular membrane element 14 is connected to the current collector 42 of the second tubular membrane element 16 located directly adjacent thereto and the current collector 42 of the second tubular membrane element 16 is connected to the current collector elements 40 of the next, adjacent first tubular membrane element.

Figure 3:
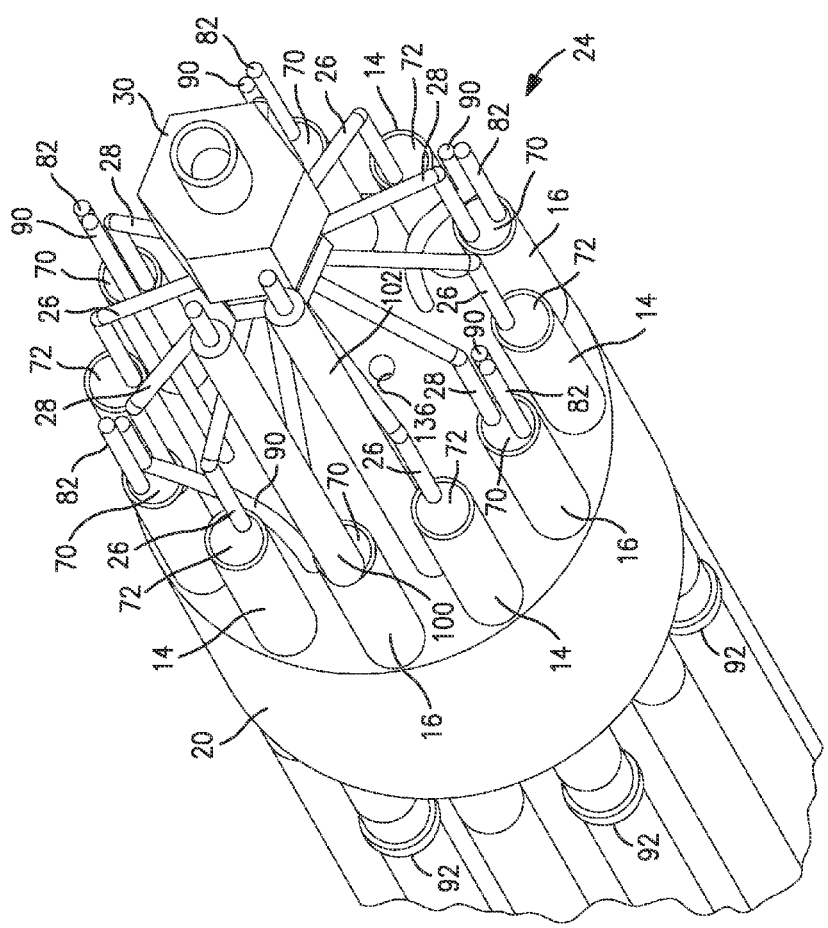
FIG. 3 is an enlarged, fragmentary perspective view of the module shown in FIG. 2.

Thus, as can best be seen in FIG. 3, the conductor 90 of each of the first tubular membrane elements 14 is connected to the end of the electrical feed through 82 of each of the adjacent second tubular membrane elements 16 and the conductor 90 passes through the second insulating member 20 for connection to such adjacent first tubular element 14 at loop 92 thereof. Since the first tubular membrane elements 16 and the second tubular membrane element 14 are reversed, at the first insulating member 18, the conductor 90 connects to the electrical feed through 82 of each of the first tubular membrane elements 14, passes through the first insulating member 18 and then is connected to the second tubular membrane elements 16 via the loop 92 thereof. This being said in case of two adjacent first and second tubular membrane elements 14, 16 such connection between the elements as aforesaid is not established and instead, power cords 100, 102 are connected to the electrical feed through 82 of the second tubular membrane element 16 and the current collector layer 42 of the first tubular membrane element 14 so that the electrical potential can be applied to the first and second tubular membrane elements 14 and 16.

With reference again to FIG. 1, the enclosure 12 has two opposite end walls 104, 106 provided within opposite openings 108, 110 within which the insulating members 18, 20 are lodged with the ends of the first and second tubular membrane elements 14, 16 exposed. The opposite end walls 104, 106 are connected by a sidewall 112 thereby define a heated enclosure 114 that is heated by heating elements 116 embedded within the sidewall 112. Attached to the end walls 104, 106 are inlet regions 120, 122 defined by the interior of cowlings 124, 126 respectively. Attached to the cowlings 124, 126 are blowers 128, 130, respectively, that direct feed air streams 44 to the inlet regions 120, 122. With brief reference to FIG. 3, the insulating member 20 is provided with an opening in the form of an axial bore 136 that allows part of the feed air stream 44 to flow past the ends of the tubular membrane elements 14, 16 and thereby cool the ends and the deposits of elastomer that form the end seals before passing into the heated enclosure 114 and contact the first and second tubular membrane elements 14, 16. Although not illustrated, insulating member 18 is provided with a like opening to allow at least a portion of the feed air stream 44 to flow past the exposed ends of the first and second tubular membrane elements 14, 16 and into the heated enclosure 114 for the same purpose. The separation of the oxygen from the feed air streams 44 form a retentate that is discharged from the heated enclosure 114, through an exhaust 136 as a retentate stream 138.

As can be appreciated, embodiments of the present invention are possible in which in lieu of the axial bores or other openings within insulating members 18, 20; openings could be situated within the end walls 104, 106. The ends of the first and second tubular membrane elements 14, 16 would not be cooled to the same extent as in the illustrated embodiment. Also, the openings in the insulating members, such as the illustrated insulating members 18, 20 could be used in connection with an embodiment that did not have the first and second collection networks 22, 24 of the present invention; or in other words, a single manifold collecting oxygen from all tubular membrane elements used in such embodiment.

With reference again to FIG. 2, oxygen product streams 140, 142 are withdrawn from the first tubular elements 14 and the second tubular elements 16 by lines 144, 146 connected to the collection elements 30 of second and first collection networks 24, 22 respectively. The lines would pass through the cowlings 124, 126 and then to a receiving tank 200 (See FIG. 5) that would collect the oxygen product at pressure. As mentioned above, a central advantage of having the separate portions of the tubular membrane elements 14, 16 is to prevent failure of the entire oxygen separation device 1 upon failure of a tubular membrane element. Moreover, where oxygen separation device 1 is used to supply oxygen to a receiving tank 200 under pressure, if a tubular membrane element failed, then high purity oxygen product would be lost from the receiving tank 200. In order to prevent this, check valves 148, 150 are provided to isolate the first tubular membrane elements 14 from the second tubular membrane elements 16 respectively, and thereby to prevent the loss of pressurized product oxygen upon failure of a tubular membrane element of either of the two portions.

With reference to FIG. 6, the pressure inside of the modules 10 and ceramic membrane elements 14, 16 can be up to about 250 psig during operation of the ceramic oxygen generator. In order to maintain this high pressure, the ceramic modules 10 are sealed at the ends using VITON® plug-like members and ceramic adhesive (See FIG. 4). While the VITON® material and adhesives are sufficient in terms of maintaining pressure inside the ceramic modules 10, it has been observed that the VITON® material does not create a perfect seal, thereby allowing the high purity oxygen to leak from the ends of the ceramic modules 10 and allow nitrogen or other contaminants to diffuse into the modules 10 and ceramic membrane elements 14, 16 when the ceramic oxygen generator is not operating. In addition, the ceramic modules 10 and associated collection networks 22, 24 and manifolds 180, 182 contain a significant number of fittings that are also potential sources of leaks.

In operation, the ceramic oxygen generator or ceramic oxygen generator generally cycles between pressurizing mode and idle mode. During the pressurizing mode, the ceramic oxygen generator produces high purity oxygen and fills a receiving tank 200 with the high purity oxygen to a maximum pressure of about 250 psig. Upon filling the receiving tank 200 with high purity oxygen, the applied voltage differential is removed thereby terminating oxygen generation and rendering the ceramic oxygen generator to idle mode. The ceramic oxygen generator remains in the idle mode until the receiving tank 200 reaches a preset low pressure value, upon which the ceramic oxygen generator re-initiates the pressurizing mode. The duration of time the ceramic oxygen generator operates in idle mode before re-initiating to pressurizing mode is dependent on the oxygen supply requirements of the end-user.

The high purity oxygen that is contained inside the ceramic modules 14, 16 can leak out at the end seals 70, 72; collection networks 22, 24; manifolds 180, 182 or fittings, causing the pressure inside the ceramic membrane elements 14, 16 and modules 10 to drop during idle mode periods. The extent to which the pressure inside the modules 10 and ceramic membrane elements 14, 16 drops depends on a combination of factors, including the duration of the idle mode period and the magnitude or severity of any leaks that are present at the end seals 70, 72; collection networks 22, 24; manifolds 180, 182 and various fittings.

In addition, the ceramic membrane elements 14, 16 are isolated from the receiving tank 200 by a series of check valves 148, 150 that prohibit oxygen from flowing from the receiving tank 200 back to the ceramic membrane elements 14, 16. As a result, as the pressure inside the ceramic membrane elements 14, 16 decreases, the rate of diffusion of nitrogen from the surrounding air into the ceramic membrane elements 14, 16 increases. This introduction of nitrogen into the ceramic membrane elements 14, 16 results in oxygen purity degradation. In particular, when the ceramic oxygen generator switches from idle mode to pressurizing mode, any nitrogen that has diffused into the ceramic membrane elements 14, 16 is mixed with the oxygen that is being generated by the ceramic membrane elements 14, 16, causing a decrease in the overall purity of the oxygen.

In order to avoid or mitigate this decrease in oxygen purity, the ceramic oxygen generator 1 includes a purge valve assembly 170 that is located downstream of the check valves 148, 150 separating the ceramic membrane elements 14, 16 from the oxygen receiving tank 200. Upon initiation of the pressurizing mode of the ceramic oxygen generator, the purge valve assembly 170 is commanded to the open position and any nitrogen that diffused into ceramic membrane elements together with any oxygen generated inside ceramic membrane elements is vented.

Specifically, the purge valve assembly 170 is commanded to an open or actuated position by the microprocessor based controller (not shown) for a pre-set or prescribed duration of time, preferably about 10 to 60 minutes, to ensure all nitrogen or other contaminating gases within the ceramic membrane elements 14, 16 are adequately flushed out of the ceramic oxygen generator. The vented or purged gas is preferably vented into the cabinet or housing 195 of the ceramic oxygen generator where it is diluted with the exhaust air. This purge mode would repeat at the initiation of each pressurizing mode. A flow orifice 190 is preferably placed at the outlet of the purge valve assembly 170 to prevent a rapid depressurization of the ceramic membrane elements and/or to maintain the pressure inside the ceramic membrane elements during the purge mode. During the purge mode, the purge valve assembly 170 remains open for a time period that is determined to be sufficient to remove nitrogen and other gas contaminants to the desired levels, after which the purge valve assembly 170 automatically closes and the pressurizing mode of the ceramic oxygen generator continues until the receiving tank 200 is full. Once full, the applied electric potential is removed from the modules and ceramic oxygen generator is set to idle mode.

To validate the benefits and efficacy associated with the present post-idle purge process or purge mode, experiments were conducted using a representative model of the ceramic oxygen generator described herein. In a first test run, the ceramic oxygen generator was idled for a period of one week (i.e. seven days). The level of nitrogen gas in the receiving tank was measured at 0.5 ppm. The purge valve assembly was opened and the ceramic oxygen generator was operated in pressurizing mode for 30 minutes after which the purge valve was closed and the receiving tank refilled with high purity oxygen. As seen in Table 1, the nitrogen gas contained in the refilled receiving tank rose to a level of about 2.9 ppm. This slight rise in impurity level is associated with nitrogen gas diffusing into the ceramic oxygen generator from surrounding air during the idle period that was not purged during the purge mode operation. Operating the purge mode for a longer duration would likely reduce the observed level of nitrogen gas impurities.

In a second test run, the same ceramic oxygen generator was idled for a period of only one (1) day. The level of nitrogen gas impurities in the receiving tank was initially measured at 2.9 ppm. The purge valve assembly remained closed so that no purge operation or purge mode was conducted. The ceramic oxygen generator was operated in pressurizing mode refilling the receiving tank. As seen in Table 1, the nitrogen gas impurities contained in the receiving tank rose to a level of about 42.0 ppm. This significant rise in nitrogen gas impurity level is associated with nitrogen gas diffusing into the ceramic oxygen generator from surrounding air during the idle period that was not purged.

TABLE 1

| Idle Mode Duration | Purge Mode | Purge Mode Duration | N2 in Receiving tank (idle mode) | N2 in Receiving tank (pressurization mode) |
| --- | --- | --- | --- | --- |
| 7 days | Yes | 30 Min | 0.5 ppm | 2.9 ppm |
| 1 day | No | N/A | 2.9 ppm | 42.0 ppm |

From the foregoing, it should be appreciated that the present invention thus provides a ceramic oxygen generator for the production of high purity or ultra high purity oxygen. While the invention herein disclosed has been described by means of specific embodiments and processes associated therewith, numerous modifications and variations can be made thereto by those skilled in the art without departing from the scope of the invention as set forth in the appended claims or sacrificing all of its features and advantages. For example, the manifolds and check valves of the presently disclosed ceramic oxygen generator can be advantageously integrated into the oxygen collection network(s) of the oxygen separation module(s) or may be designed as separate elements downstream of the oxygen separation module(s). Another contemplated variation from the disclosed embodiments is to configure the ceramic oxygen generator with a plurality of modules with each module having a bundle of ceramic membrane elements connected in series and terminating in a single collection network. Each module or collection network would further include or be coupled to a single check valve and delivers the separated oxygen stream to a collective manifold for all of the modules.

The invention claimed is:

1. An electrically driven ceramic oxygen generator comprising:
    at least one oxygen separation module disposed within an enclosure, the oxygen separation module comprising a plurality of ceramic membrane elements and at least one collection network, each of the ceramic membrane elements having an anode layer, a cathode layer, an electrolyte layer located between the anode layer and the cathode layer and each of the ceramic membrane elements configured to separate oxygen from an oxygen containing feed stream when an electric potential difference is applied between the anode layer and the cathode layer to induce oxygen ion transport in the electrolyte, and wherein the collection network is configured to collect the separated oxygen;
    a power source electrically coupled to the oxygen separation module and the plurality of ceramic membrane elements to apply the electric potential difference between the anode layer and the cathode layer of each the ceramic membrane elements;
    a receiver tank coupled to the collection network of the oxygen separation module and configured to receive the separated oxygen;
    a purge valve assembly operatively connected to the collection network of the oxygen separation module and configured to vent a flow of separated oxygen from the oxygen separation module when the purge valve assembly is open or actuated; and
    a controller operatively configured to: (i) open or activate the purge valve assembly for a prescribed duration upon initiation of the applied electric potential difference to the oxygen separation module so as to vent or exhaust the separated oxygen and any contaminants contained therein to the surrounding air; and (ii) close or deactivate the purge valve assembly after the prescribed duration so as to direct the separated oxygen to the receiver tank.

2. The ceramic oxygen generator of claim 1, wherein the plurality of plurality of ceramic membrane elements are of tubular configuration.

3. The ceramic oxygen generator of claim 2, wherein each of the tubular ceramic membrane elements has an inner anode layer, an outer cathode layer, an electrolyte layer located between the anode layer and the cathode layer to form the electrolyte and two current collector layers located adjacent to and in contact with the anode layer and the cathode layer and situated on the inside and outside of the tubular ceramic membrane elements to allow the electrical potential to be applied by the power source; and wherein the separated oxygen is produced on the inside of the tubular ceramic membrane elements.

4. The ceramic oxygen generator of claim 1 wherein the purge valve assembly further comprises a flow orifice configured to maintain the pressure inside the ceramic membrane elements when the electric potential difference is applied the ceramic membrane elements and the purge valve assembly is open.

5. The ceramic oxygen generator of claim 1 further comprising at least one check valve disposed upstream of the receiver tank and downstream of the collector network, the at least one check valve configured to permit the flow of the separated oxygen from the oxygen separation module to the receiver tank but prevent flow from the receiver tank back to the oxygen separation module.

6. The ceramic oxygen generator of claim 1 wherein the ceramic oxygen generator comprises a plurality of oxygen separation modules and further comprises at least one manifold disposed upstream of the receiver tank and downstream of the plurality of oxygen separation modules, the manifold configured to receive the flows of separated oxygen from the plurality of oxygen separation modules and direct the combined flow to the receiver tank or the purge valve assembly.

7. The ceramic oxygen generator of claim 6 wherein the plurality of oxygen separation modules each have a bundle of tubular ceramic membrane elements having an inner anode layer, an outer cathode layer, an electrolyte layer located between the anode layer and the cathode layer wherein the separated oxygen is produced on the inside of the tubular ceramic membrane elements and each of the plurality of oxygen separation modules is coupled via a check valve to the manifold configured to receive the flows of separated oxygen from the tubular ceramic membrane elements within each of the oxygen separation modules and direct the combined flow to: (i) the receiver tank when the purge valve assembly is closed; and (ii) an exhaust or vent when the purge valve assembly is open.

8. A method of enhancing the purity of oxygen generated by a ceramic oxygen generator comprising the steps of:
(a) initiating start-up of the ceramic oxygen generator by applying an electric potential difference between an anode layer and a cathode layer of a plurality of ceramic membrane elements to induce oxygen ion transport in an electrolyte located between the anode layer and the cathode layer and produce an oxygen stream, wherein the plurality of ceramic membrane elements are contained within at least one oxygen separation module of the ceramic oxygen generator and are configured to separate oxygen from an oxygen containing feed stream when the electric potential difference is applied;
(b) purging the oxygen stream produced in the at least one oxygen separation module by venting the produced oxygen stream and any contaminants entrained therein via an open purge valve assembly disposed downstream of the at least one oxygen separation module for a prescribed duration; and
(c) closing the purge valve assembly and continuing to apply the electric potential difference between the anode layer and the cathode layer of the plurality of ceramic membrane elements to produce a high purity oxygen stream;
wherein the ceramic oxygen generator is in a pressurizing mode when the electric potential difference is applied between the anode layer and the cathode layer of the plurality of ceramic membrane elements and the purge valve assembly is closed; and
wherein the ceramic oxygen generator is in a purge mode when the electric potential difference is applied between the anode layer and the cathode layer of the plurality of ceramic membrane elements and the purge valve assembly is open.

9. The method of claim 8 further comprising the step of: (d) removing the electric potential difference between the anode layer and the cathode layer to cease production of the high purity oxygen stream wherein the ceramic oxygen generator is in an idle mode when the electric potential difference is removed between the anode layer and the cathode layer of the plurality of ceramic membrane elements.

10. The method of claim 9 wherein steps (a) through (c) are repeated after the idle mode.

11. The method of claim 8 further comprising the step of directing the high purity oxygen stream to a receiving tank.

12. The method of claim 8 further comprising the step of directing the high purity oxygen stream to an end-use application.

* * * * *